US009141563B2

(12) United States Patent
Kanamori et al.

(10) Patent No.: US 9,141,563 B2
(45) Date of Patent: Sep. 22, 2015

(54) MEMORY SYSTEM (71) Applicant: Kabushiki Kaisha Toshiba, Minato-ku (JP)

(72) Inventors: Yuki Kanamori, Kamakura (JP); Norikazu Yoshida, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/142,066

(22) Filed: Dec. 27, 2013

(65) Prior Publication Data
US 2015/0074298 A1 Mar. 12, 2015

Related U.S. Application Data (60) Provisional application No. 61/876,605, filed on Sep. 11, 2013.

(51) Int. Cl.
G06F 3/00 (2006.01)
G06F 5/00 (2006.01)
G06F 13/10 (2006.01)

(52) U.S. Cl.
CPC .................................. G06F 13/10 (2013.01)

(58) Field of Classification Search
None
See application file for complete search history.

(56) References Cited

U.S. PATENT DOCUMENTS

| | | | | |
|---|---|---|---|---|
| 6,141,707 A * | 10/2000 | Halligan et al. | | 710/36 |
| 7,308,521 B1 * | 12/2007 | Sutardja | | 710/305 |
| 7,568,056 B2 * | 7/2009 | Danilak | | 710/36 |
| 8,225,019 B2 * | 7/2012 | Asnaashari | | 710/74 |
| 2006/0075164 A1 * | 4/2006 | Ooi | | 710/58 |
| 2010/0161936 A1 | 6/2010 | Royer et al. | | |
| 2011/0078222 A1 | 3/2011 | Wegener | | |
| 2011/0093659 A1 | 4/2011 | Jo et al. | | |
| 2012/0102263 A1 | 4/2012 | Aswadhati | | |
| 2012/0110259 A1 * | 5/2012 | Mills et al. | | 711/113 |
| 2012/0210027 A1 * | 8/2012 | Intrater et al. | | 710/74 |
| 2012/0311197 A1 | 12/2012 | Larson et al. | | |
| 2013/0060981 A1 * | 3/2013 | Horn et al. | | 710/107 |

* cited by examiner

Primary Examiner — Elias Mamo
(74) Attorney, Agent, or Firm — Oblon, McClelland, Maier & Neustadt, L.L.P.

(57) ABSTRACT

According to one embodiment, a command processing device includes a frontend part and a backend part. The frontend part is configured to execute a data communication with respect to a host based on a predetermined communication protocol, and accept a request of an execution of first and second commands from the backend part. The backend part is configured to queue commands including the first and second commands, and execute a data communication according to the first command with respect to an attachment device and a data communication according to the second command with respect to the attachment device in parallel.

20 Claims, 11 Drawing Sheets

MEMORY SYSTEM

CROSS-REFERENCE TO RELATED APPLICATIONS

This application claims the benefit of U.S. Provisional Application No. 61/876,605, filed Sep. 11, 2013, the entire contents of which are incorporated herein by reference.

FIELD

Embodiments described herein relate generally to a command processing device and a data storage device.

BACKGROUND

For instance, the Advanced Host Controller Interface (AHCI) standard applied to, for example, PCIe-SSD is provided for a host bus adaptor (HBA) based on the Serial Advanced Technology Attachment (SATA) protocol. According to AHCI, since the HBA performs serial processing of processing commands one by one, it is inhibited from accepting other commands while a data transfer corresponding to a predetermined command is being performed between the HBA and a device.

Accordingly, even where a plurality of commands are sequentially queued from a host to the HBA independently of data transfer therebetween, as in, for example, Native command Queuing (NCQ), the data transfer between the HBA and the device is performed only using a slot that is activated by, for example, a tag (command) included in a protocol called DMA setup FIS.

DETAILED DESCRIPTION

In general, according to one embodiment, a command processing device comprises: a frontend part and a backend part. The frontend part is configured to: execute a data communication with respect to a host based on a predetermined communication protocol, and accept a request of an execution of first and second commands from the backend part. The backend part is configured to: queue commands including the first and second commands, and execute a data communication according to the first command with respect to an attachment device and a data communication according to the second command with respect to the attachment device in parallel.

(Outline)

The embodiments described below relate to, for example, a transfer protocol in the AHCI standard. In the AHCI standard, even a case where a plurality of commands are queued by NCQ, only one command is acceptable, and hence the data transfer between the HBA and an attachment device is basically performed only for the command.

However, in data storage devices, such as a PCIe-SSD, a function equivalent to the HBA is comprised of therein. For instance, in the PCIe-SSD, a memory controller corresponding to the HBA and a memory device corresponding to the attachment device are formed integral as one body, and produced/sold as one package product.

In this case, the memory controller corresponding to the HBA does not have to completely comply with a SATA communication protocol, because the data communication between the memory controller and the memory device cannot be seen from the outside.

Further, in data storage devices such as the PCIe-SSD, the memory controller is often connected to the memory device via a plurality of channels. In this case, if a plurality of data transfers can be performed via respective channels using respective tags (commands), efficiency of command processing and/or data transfer is enhanced.

In light of this, the embodiments described below are constructed such that when, for example, a plurality of commands are queued by NCQ, they are enabled to be simultaneously accepted, that is, a plurality of data transfers corresponding to the commands can be performed in parallel between the HBA and the attachment device.

(System)

Figure 1:
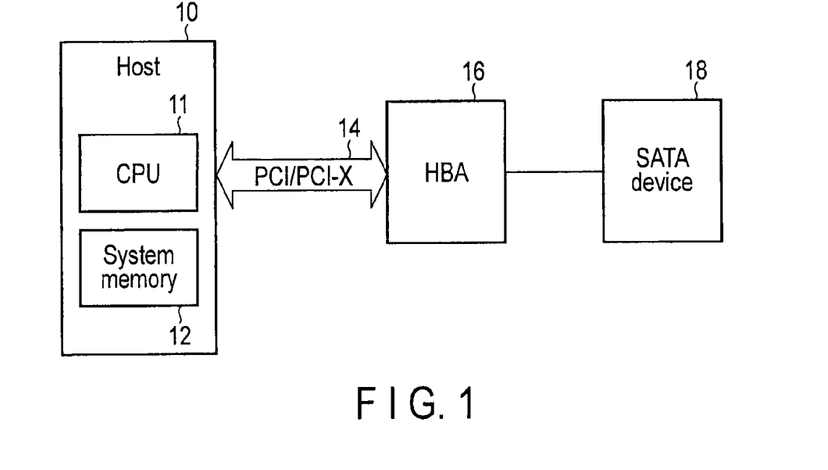
FIG. 1 is a block diagram showing a system configuration example.

FIG. 1 shows a system configuration example according to the AHCI standard.

As shown, a host 10 is connected to a SATA device (such as a network device or a data storage device) 18 via a HBA 16. The host 10 and the HBA 16 are connected to each other by a PCI/PCI-X bus 14, while the HBA 16 and the SATA device 18 are connected to each other by SATA. The host 10 comprises a CPU 11 configured to control the operation of the entire system, and a system memory 12 configured to store data necessary for the system. The HBA 16 is a device for connecting the CPU 11 (host) to the SATA device (such as a network device or a data storage device) 18.

In the data storage devices such as the PCIe-SSD, a memory controller corresponding to the HBA 16 and a memory device corresponding to the SATA device (attachment device) 18 are formed integral as one body. Accordingly, a plurality of data transfers between the HBA 16 and the SATA device 18 corresponding to a plurality of commands can be performed in parallel.

Figure 2:
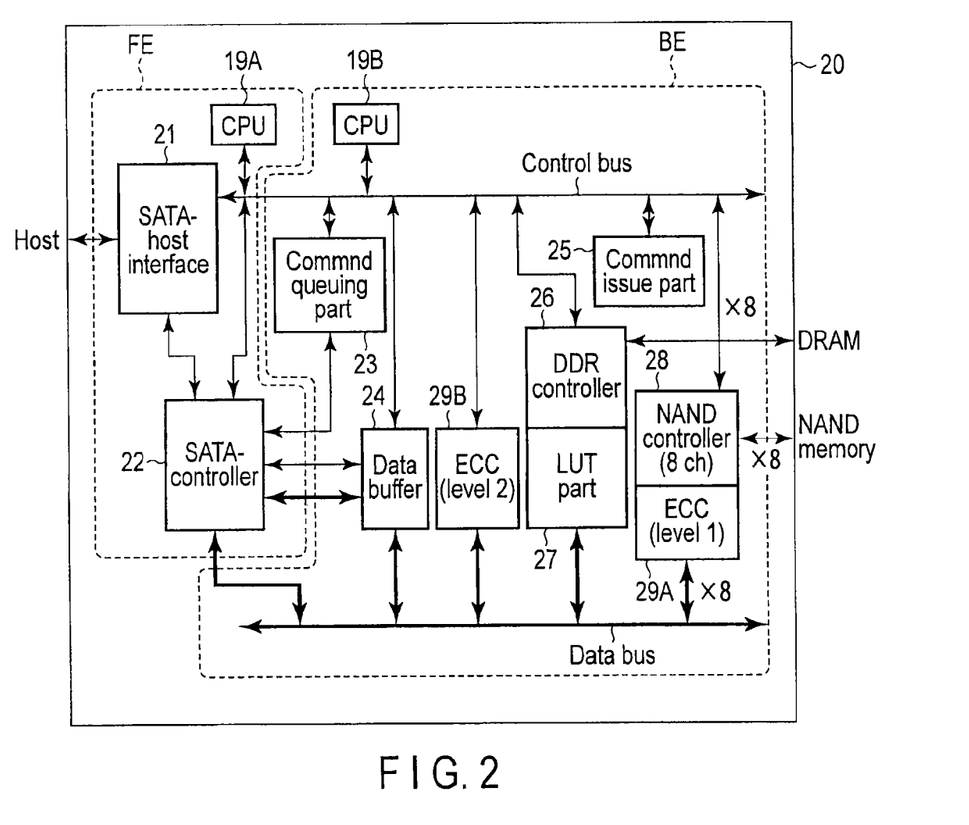
FIG. 2 is a block diagram showing a configuration example of a memory controller.

FIG. 2 shows an example of the memory controller.

As shown, a memory controller 20 comprises a frontend part FE and a backend part BE.

The frontend part FE comprises a frontend CPU 19A configured to control the operations performed in the frontend part FE, a SATA host interface 21 as an interface for the host, and a SATA controller 22 configured to control data communication with the backend part BE.

The backend part BE comprises a backend CPU 19B configured to control the operations in the backend part BE, a command queuing part 23 configured to queue a plurality of commands, a data buffer (e.g., an SRAM) 24 configured to primarily store data, a command issue part 25 configured to issue commands, a double data rate (DDR) controller 26 configured to control a DRAM as an external memory, a LUT part 27 configured to temporarily store a lookup table read from the DRAM, a NAND controller 28 configured to control a NAND memory, and ECC circuits 29A and 29B configured to correct data in the NAND memory.

The NAND controller 28 includes, for example, 8 channels. In this case, the NAND controller 28 can independently control 8 memories. The ECC circuit (level 2) 29B has a higher error correction function than the ECC circuit (level 1) 29A. In accordance with the status of use of the NAND memory, it is determined which one of the ECC circuits 29A and 29B should be used.

Figure 3:
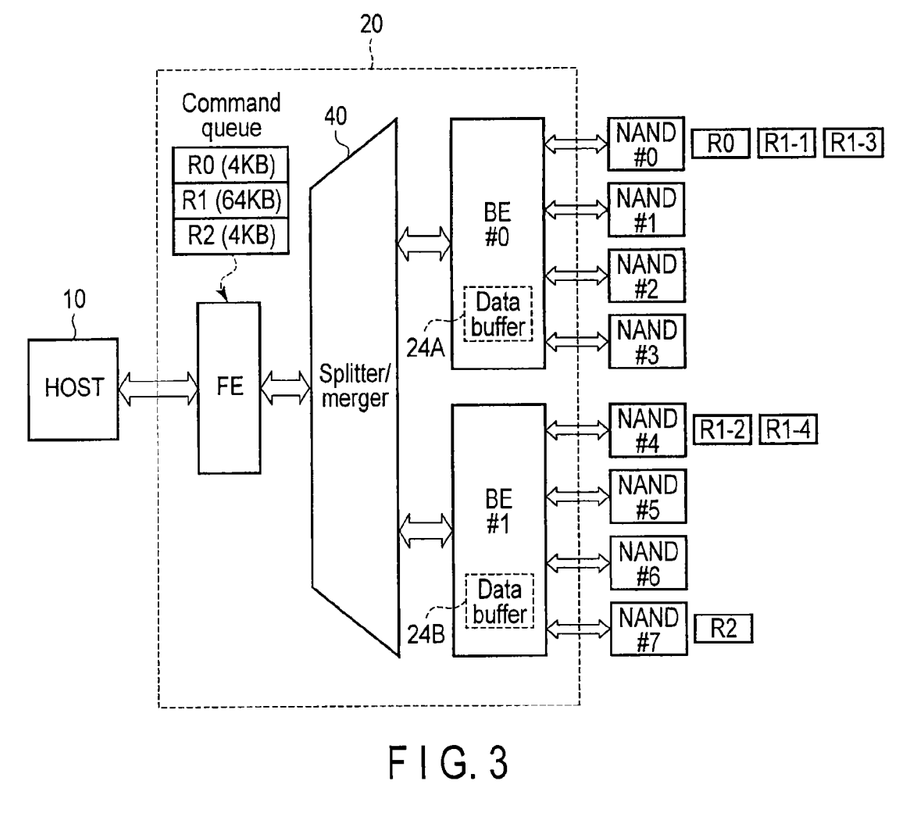
FIG. 3 a block diagram showing the relationship between a frontend part and a backend part.

FIG. 3 shows the relationship between the frontend part and the backend part.

The frontend part FE and the backend part BE are connected to each other via a splitter/merger 40. The splitter/merger 40 performs splitting and merging of the data transferred from the host 10 to a memory device (e.g., a NAND device), or from the memory device to the host 10.

The backend part BE comprises a first backend BE#0 and a second backend BE#1. The first backend BE#0 has a first data buffer 24A, while the second backend BE#1 has a second data buffer 24B.

The first backend BE#0 performs data communication (read/write) associated with, for example, a first command via the first data buffer 24A, while the second backend BE#1 performs data communication (read/write) associated with, for example, a second command via the second data buffer 24B.

In the embodiments, the memory controller 20 comprises 8 channels—NAND #0, NAND #1, NAND #2, NAND #3, NAND #4, NAND #5, NAND #6 and NAND #7. The four channels NAND #0, NAND #1, NAND #2 and NAND #3 are connected to the first backend BE#0, and the other four channels NAND #4, NAND #5, NAND #6 and NAND #7 are connected to the second backend BE#1.

Reference numbers R0, R1-1, R1-2, R1-3, R1-4 and R2 denote read data read from, for example, the channels.

The frontend part FE can accept, in parallel, the requests associated with execution of a plurality of commands and output from the first and second backend parts BE#0 and BE#1. To this end, the frontend part FE comprises a first controller configured to control access to the first data buffer 24A, and a second controller configured to control access to the second data buffer 24B.

Figure 4:
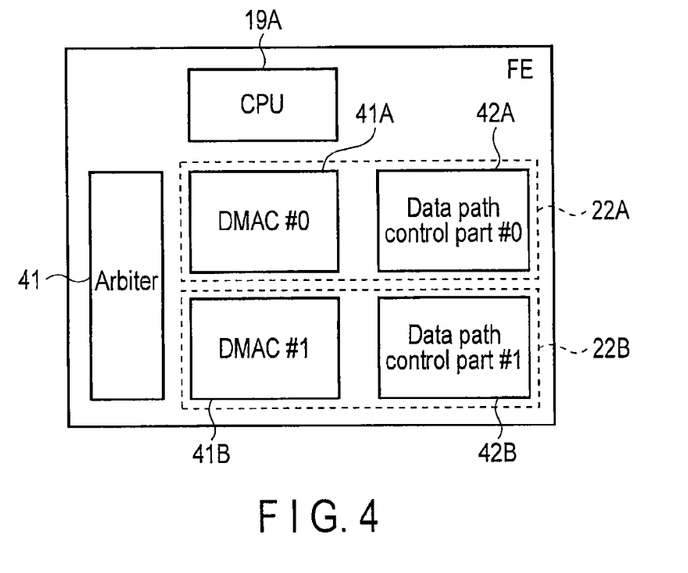
FIG. 4 is a block diagram showing examples of SATA controllers in the frontend part.

FIG. 4 shows controller examples in the frontend part.

A first controller (e.g., a SATA controller) 22A comprises a direct memory access controller (DMAC#0) 41A, and a data path control part #0 configured to control the data path between the DMAC#0 41A and the first data buffer 24A shown in FIG. 3.

A second controller (e.g., a SATA controller) 22B comprises a direct memory access controller (DMAC#1) 41B, and a data path control part #1 configured to control the data path between the DMAC#1 41B and the second data buffer 24B shown in FIG. 3.

An arbiter 41 determines whether the first controller 22A or the second controller 22B should be selected when communication is performed between the host 10 and the memory controller 20 as shown in FIG. 3.

If the arbiter 41 selects the first controller 22A, read/write associated with, for example, the four channels NAND #0, NAND #1, NAND #2 and NAND #3 shown in FIG. 3 is performed. In contrast, if the arbiter 41 selects the second controller 22B, read/write associated with the other four channels NAND #4, NAND #5, NAND #6 and NAND #7 shown in FIG. 3 is performed.

The operations in the frontend part FE are controlled by the frontend CPU 19A.

By employing the above-described frontend part FE and the backend part BE, data transfers associated with a second command can be inserted in an empty band if the empty band, i.e., an unoccupied time period (available time period) in which no data transfers are performed, occurs during data transfers associated with a first command. Namely, interruption by a data transfer associated with the second command can be performed during a data transfer associated with a first command.

For instance, during a data reading associated with the first command, a data reading associated with the second command can be performed. Further, during a data writing associated with the first command, a data writing associated with the second command can be performed.

Similarly, during a data reading associated with the first command, a data writing associated with the second command can be performed, and during a data writing associated with the first command, a data reading associated with the second command can be performed.

As described above, the parallel processing of a plurality of queued commands, for example, can enhance the efficiency of command processing and/or data transfer.

EMBODIMENTS

Figure 5:
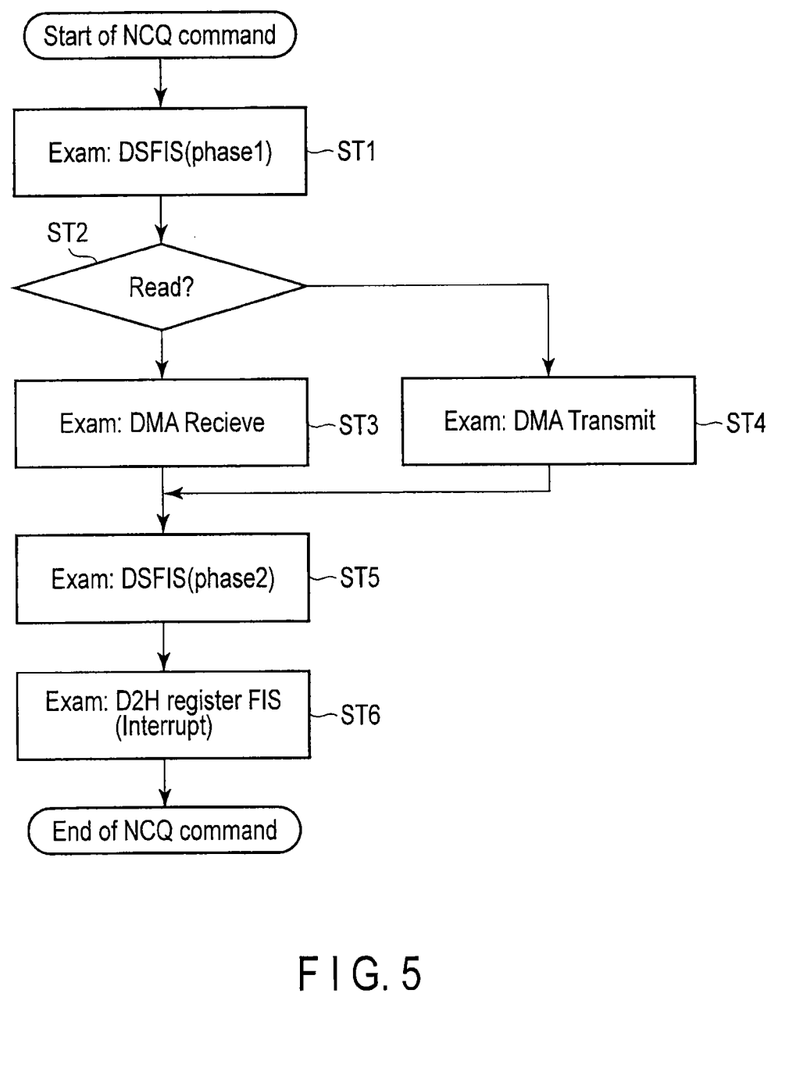
FIG. 5 is a flowchart showing a processing procedure according to embodiments.

FIG. 5 shows the processing procedure employed in the embodiments.

In the embodiments, descriptions will be given of the case of processing NCQ commands.

Figure 6:
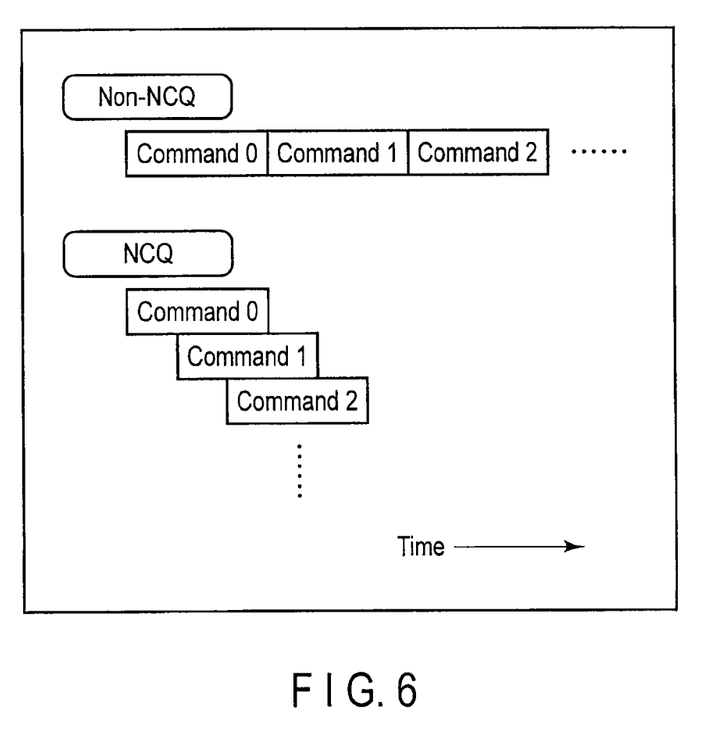
FIG. 6 shows the difference between NCQ and non-NCQ.

When processing NCQ commands, in the conventional example, commands 0, 1 and 2 are sequentially processed in a serial manner, while in the embodiments, commands 0, 1 and 2 are processed in parallel, as is shown in FIG. 6.

Specifically, firstly, DMA setup FIS (Phase 1) is executed (step ST1).

DMA setup FIS (DSFIS) is an FIS used in a direct memory access (DMA) transfer mode. In DSFIS (Phase 1), two or more commands (execution commands) as execution targets are selected from a plurality of queued commands.

Further, in DSFIS (Phase 1), processing of determining slots as data transfer targets is executed. This processing is performed only within a device, such as the memory controller, and FIS transfer to the host is not performed.

Also, in the conventional example, only one slot is selected for data transfer even when executing NCQ commands. In contrast, in the embodiments, when executing NCQ commands, two or more slots are selected as data transfer targets.

Subsequently, it is determined whether each of two or more commands (execution commands) as execution targets is associated with data reading or data writing (step ST2).

If, for example, a first command is a command for executing data reading, data is transferred in a DMA transfer mode from the memory device (e.g., a NAND memory) to the memory controller (DMA receive) (step ST3).

Further, if a second command is a command for executing data writing, data is transferred in a DMA transfer mode from the memory controller to the memory device (e.g., a NAND memory) (DMA transmit) (step ST4).

Even during a data transfer, a transfer, to the host, of FIS associated with the execution commands is not performed unless an error, such as power supply interruption, occurs.

After data transfers from the device to the host (data read), or from the host to the device (data write), are completed, a transfer, to the host, of FIS associated with the execution commands, i.e., a DSFIS transfer, is performed (step ST5).

After that, a transfer, to the host, of FIS indicating that the processing associated with these execution commands has been completed, i.e., a transfer of device to host (D2H) register FIS, is performed (step ST6).

The DSFIS transfer associated with the execution commands and the D2H register FIS transfer indicating the completion of the processing are simultaneously or instantly performed, which will not raise any problem in procedure. For instance, since these transfers comply with the AHCI standard, they will raise no problem as a report to the host.

(1) First Embodiment

Figure 7:
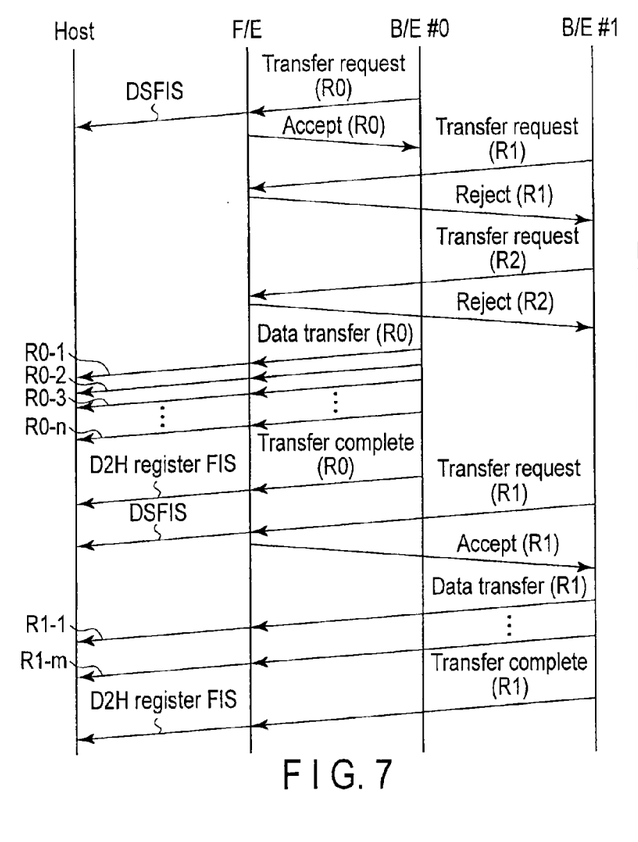
FIG. 7 shows a read flow as a comparative example.
Figure 8:
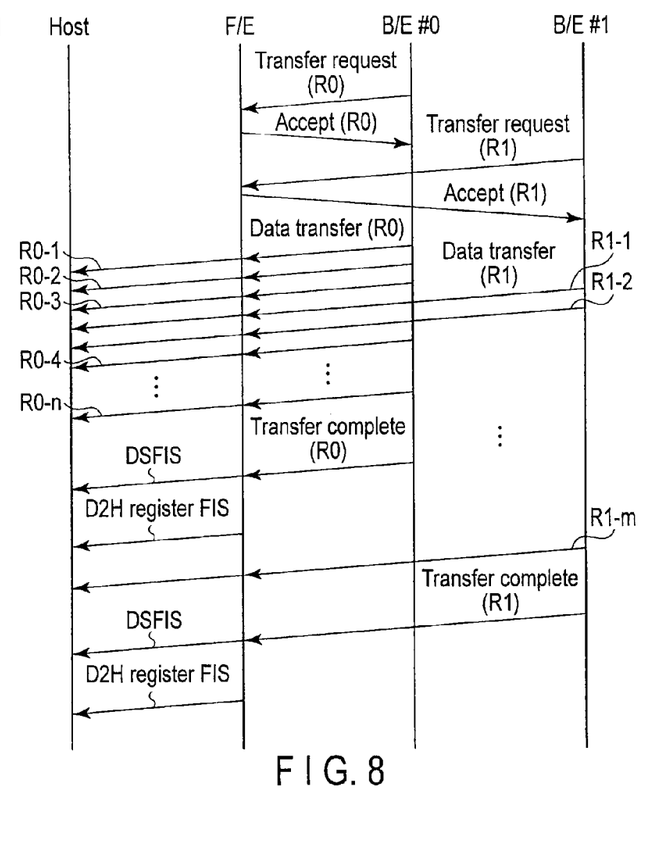
FIG. 8 shows a read flow according to a first embodiment.

FIG. 7 shows a read flow as the assumption of a first embodiment. FIG. 8 shows a read flow according to the first embodiment.

The first embodiment is characterized in that data reading associated with the second command is performed during data reading associated with the first command, thereby enabling parallel processing of the first and second queued commands to enhance the efficiency of command processing and/or data transfer.

FIG. 7 shows a conventional read flow. Assume here that the frontend part FE has accepted data transfers (accept (R0)) in response to a data transfer request (transfer request (R0)) from the backend part BE#0.

In this case, DSFIS responsive to the data transfer request is transferred from the frontend part FE to the host.

If, at this time, there are other data transfer requests (transfer request (R1) and transfer request (R2)) from the backend part BE#1 to the frontend part FE, the frontend part FE rejects data transfers corresponding to the requests, since only one execution command is acceptable in the conventional read flow (reject (R1) and reject (R2)).

After that, the backend part BE#0 performs data transfers (data readings) to the host via the frontend part FE (data transfer (R0)). R0-1, R0-2, R0-3, . . . , R0-$n$ denote the data to be transferred from the backend part BE#0 to the host via the frontend part FE (n is a natural number).

After completing the data transfers, a transfer, to the host, of FIS indicating the completion of the processing associated with the execution commands, i.e., a transfer of D2H register FIS, is performed (transfer complete (R0)).

A description will then be given of the case where the frontend part FE accepts data transfers (accept (R1)) in response to a data transfer request (transfer request (R1)) from the backend part BE#1 to the frontend part FE.

In this case, the frontend part FE transfers, to the host, DSFIS responsive to the data transfer request.

Subsequently, data transfers (data readings) are performed from the backend part BE#1 to the host via the frontend part FE (data transfer (R1)). R1-1, R1-$m$ (m is a natural number) denote the data transferred from the backend part BE#1 to the frontend part FE.

After completion of the data transfers, a transfer, to the host, of FIS indicating that the processing associated with the execution commands has been completed, i.e., a transfer of D2H register FIS, is performed (transfer complete (R1)).

The above-described conventional (comparative) example employs a protocol that complies with, for example, the AHCI standard and causes a plurality of queued commands to be sequentially processed one by one. However, in, for example, a device that comprises a memory controller (corresponding to a SATA host) and a memory device (corresponding to a SATA device) which are formed integral as one body, data transfer between the memory controller and the member device does not have to completely comply with, for example, the AHCI standard.

In light of this, the first embodiment described below proposes a protocol that enables acceptance of a plurality of execution commands and enables data transfers corresponding to the execution commands to be performed in parallel between the frontend part FE and the backend parts BE#0 and BE#1.

For instance, in the read flow of the first embodiment, first and second execution commands are acceptable as shown in FIG. 8.

Namely, the frontend part FE accepts data transfers (accept (R0)) in response to a data transfer request (transfer request (R0)) from the backend part BE#0 to the frontend part FE. The frontend part FE also accepts data transfers (accept (R1)) in response to a data transfer request (transfer request (R1)) from the backend part BE#1 to the frontend part FE.

At this time, however, DSFIS corresponding to these transfer requests is not transferred from the frontend part FE to the host.

Subsequently, data transfers (data transfer (R0), data transfer (R1)) are performed from the backend parts BE#0 and BE#1 to the host via the frontend part FE. R0-1, R0-2, R0-3, . . . , R0-$n$ denote the data to be transferred from the backend part BE#0 to the host via the frontend part FE, and R1-1, . . . , R1-$m$ denote the data to be transferred from the backend part BE#1 to the host via the frontend part FE. n and m are natural numbers.

Figure 9:
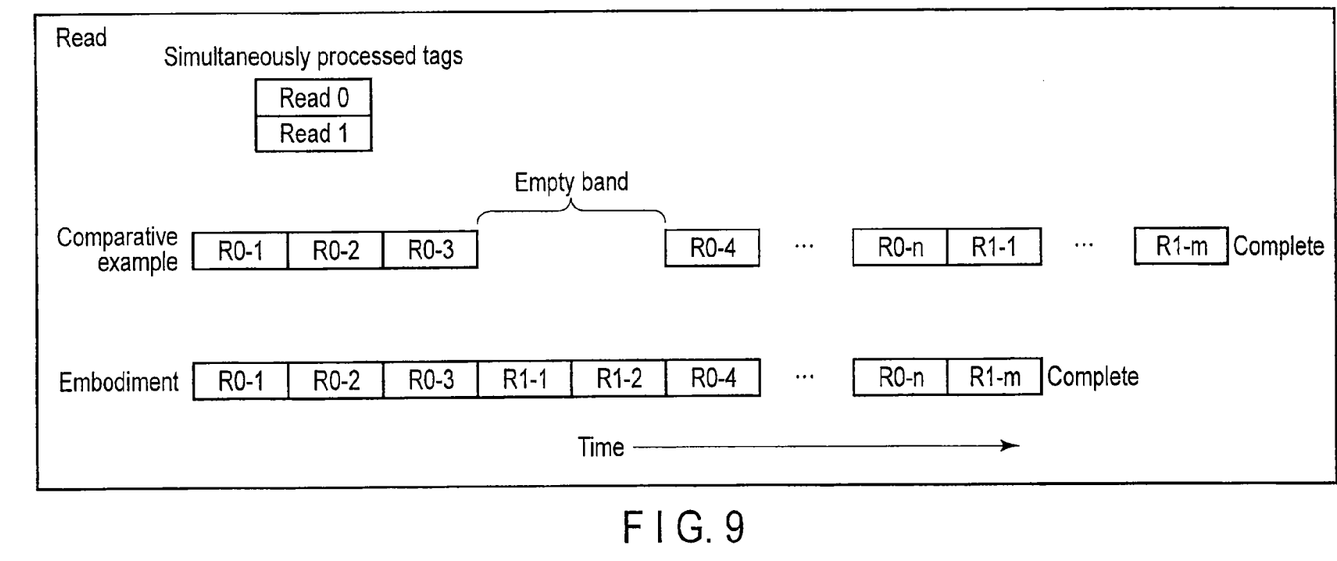
FIG. 9 shows parallel processing of a plurality of tags.

As shown in, for example, FIG. 9, the data transfers (R1-1, R1-2) from the backend part BE#1 to the frontend part FE are performed within an empty band in which no data transfers are performed from the backend part BE#0 to the frontend part FE, i.e., within an unoccupied time period (available time period) between data transfers R0-3 and R0-4.

Figure 10:
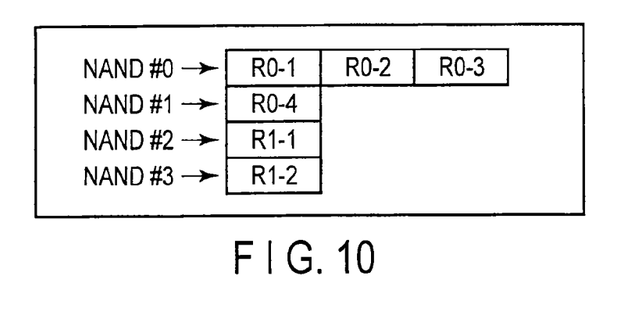
FIG. 10 shows examples of data distributed to channels.

The empty band will occur within, for example, a period in which the channel used for data transfers from the backend part BE#0 to the frontend part FE is switched from a first channel (NAND #0) to a second channel (NAND #1) as shown in FIG. 10.

At this time, data transfers (R1-1, R1-2) from the backend part BE#1 to the frontend part FE can be performed utilizing third and fourth channels (NAND #2, NAND #3).

After completing these data transfers, a transfer, to the host, of FIS indicating that the processing associated with the first and second execution commands has been completed, i.e., a D2H register FIS transfer, is performed (transfer complete (R0), transfer complete (R1)).

For instance, a DSFIS transfer associated with the first execution command and a D2H register FIS transfer indicating the completion of the processing associated with the first execution command are sequentially performed. Subsequently, a DSFIS transfer associated with the second execution command and a D2H register FIS transfer indicating the completion of the processing associated with the second execution command are sequentially performed.

(2) Second Embodiment

Figure 11:
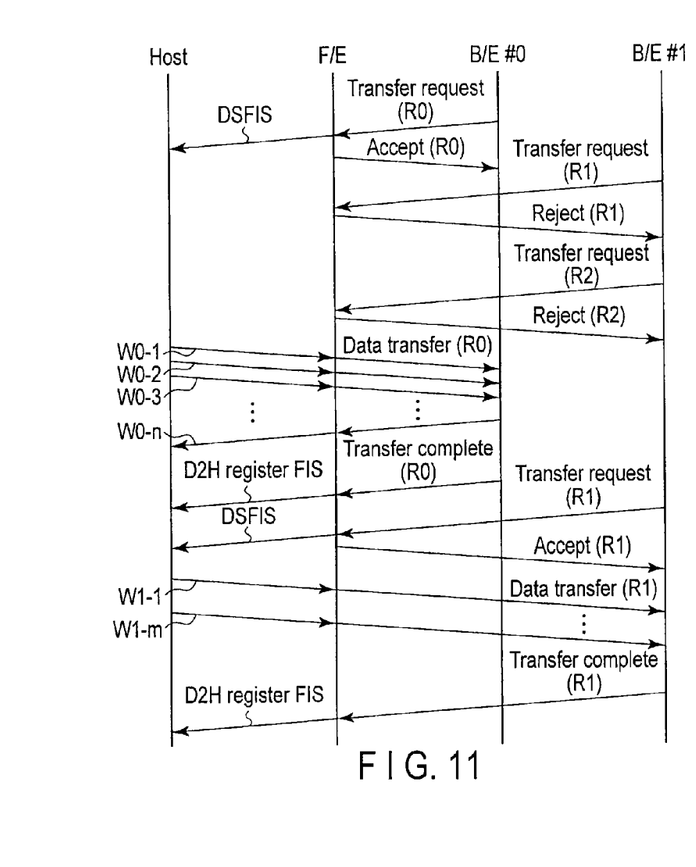
FIG. 11 shows a write flow as a comparative example.
Figure 12:
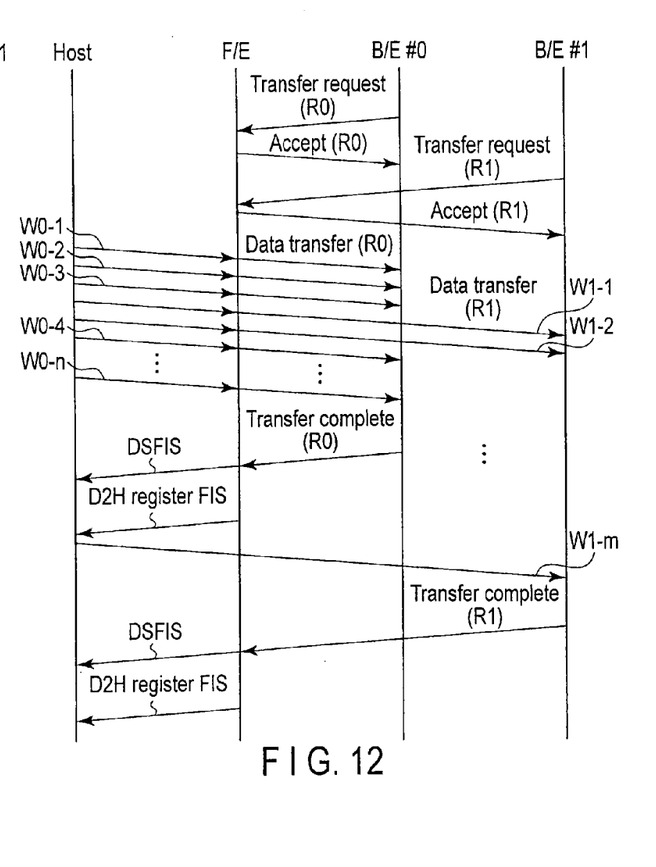
FIG. 12 shows a write flow according to a second embodiment.

FIG. 11 shows a write flow as the assumption of a second embodiment. FIG. 12 shows a write flow according to the second embodiment.

The second embodiment is characterized in that data writing associated with the second command is performed during data writing associated with the first command, thereby enabling parallel processing of the first and second queued commands to enhance the efficiency of command processing and/or data transfer.

FIG. 11 shows a conventional write flow. Assume here that the frontend part FE has accepted data transfers (accept (W0)) in response to a data transfer request (transfer request (W0)) from the backend part BE#0.

In this case, DSFIS responsive to the data transfer request is transferred from the frontend part FE to the host.

If, at this time, there are other data transfer requests (transfer request (W1) and transfer request (W2)) from the backend part BE#1 to the frontend part FE, the frontend part FE rejects data transfers corresponding to the requests, since only one execution command is acceptable in the conventional write flow (reject (W1) and reject (W2)).

After that, the host performs data transfers (data writings) to the backend part BE#0 via the frontend part FE (data transfer (W0)). W0-1, W0-2, W0-3, ..., W0-$n$ denote the data to be transferred from the host to the backend part BE#0 via the frontend part FE ($n$ is a natural number).

After completing the data transfers, a transfer, to the host, of FIS indicating the completion of the processing associated with the execution commands, i.e., a transfer of D2H register FIS, is performed (transfer complete (W0)).

A description will then be given of the case where the frontend part FE accepts data transfers (accept (W1)) in response to a data transfer request (transfer request (W1)) from the backend part BE#1 to the frontend part FE.

In this case, the frontend part FE transfers, to the host, DSFIS responsive to the data transfer request.

Subsequently, data transfers (data writings) are performed from the host to the backend part BE#1 via the frontend part FE (data transfer (W1)). W1-1, ..., W1-$m$ ($m$ is a natural number) denote the data transferred from the host to the backend part BE#1 via the frontend part FE.

After completion of the data transfers, a transfer, to the host, of FIS indicating that the processing associated with the execution commands has been completed, i.e., a transfer of D2H register FIS, is performed (transfer complete (W1)).

In contrast, the second embodiment proposes, like the first embodiment, a protocol that enables acceptance of a plurality of execution commands and enables data transfers corresponding to the execution commands to be performed in parallel between the frontend part FE and the backend parts BE#0 and BE#1.

For instance, in the write flow of the second embodiment, first and second execution commands are acceptable as shown in FIG. 12.

Namely, the frontend part FE accepts data transfers (accept (W0)) in response to a data transfer request (transfer request (W0)) from the backend part BE#0 to the frontend part FE. The frontend part FE also accepts data transfers (accept (W1)) in response to a data transfer request (transfer request (W1)) from the backend part BE#1 to the frontend part FE.

At this time, however, DSFIS corresponding to these transfer requests is not transferred from the frontend part FE to the host.

Subsequently, data transfers (data transfer (W0), data transfer (W1)) are performed from the host to the backend parts BE#0 and BE#1 via the frontend part FE. W0-1, W0-2, W0-3, ..., W0-$n$ denote the data to be transferred from the host to the backend part BE#0 via the frontend part FE, and W1-1, ..., W1-$m$ denote the data to be transferred from the host to the backend part BE#1 via the frontend part FE. $n$ and $m$ are natural numbers.

Figure 13:
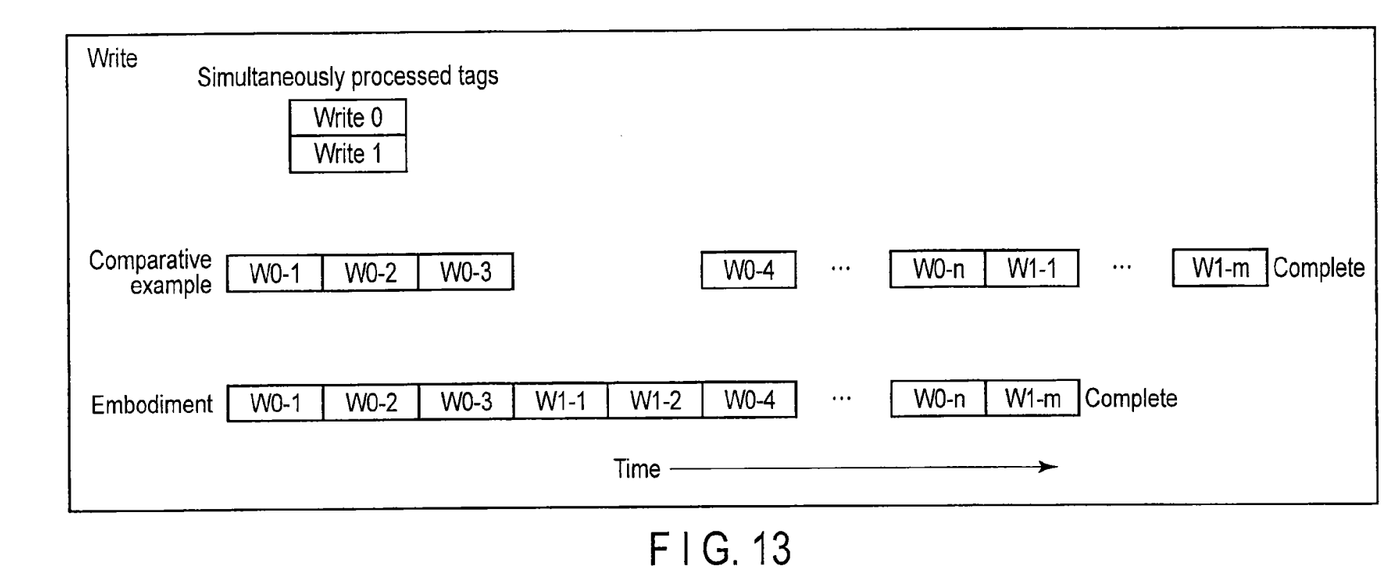
FIG. 13 shows parallel processing of a plurality of tags.

As shown in, for example, FIG. 13, the data transfers (W1-1, W1-2) from the frontend part FE to the backend part BE#1 are performed within an empty band in which no data is transferred from the frontend part FE to the backend part BE#0, i.e., within an unoccupied time period (available time period) between data transfers W0-3 and W0-4.

Figure 14:
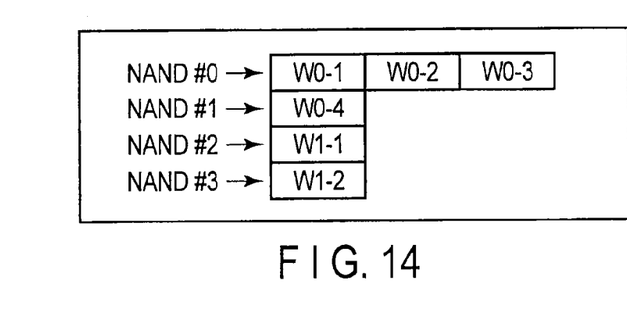
FIG. 14 shows examples of data distributed to channels.

The empty band will occur within, for example, a period in which the channel used for data transfers from the frontend part FE to the backend part BE#0 is switched from a first channel (NAND #0) to a second channel (NAND #1), as is shown in FIG. 14.

At this time, data transfers (W1-1, W1-2) from the frontend part FE to the backend part BE#1 can be performed utilizing third and fourth channels (NAND #2, NAND #3).

After completing these data transfers, a transfer, to the host, of FIS indicating that the processing associated with the first and second execution commands has been completed, i.e., a D2H register FIS transfer, is performed (transfer complete (W0), transfer complete (W1)).

For instance, a DSFIS transfer associated with the first execution command and a D2H register FIS transfer indicating the completion of the processing associated with the first execution command are sequentially performed. Subsequently, a DSFIS transfer associated with the second execution command and a D2H register FIS transfer indicating the completion of the processing associated with the second execution command are sequentially performed.

(3) Third Embodiment

Figure 15:
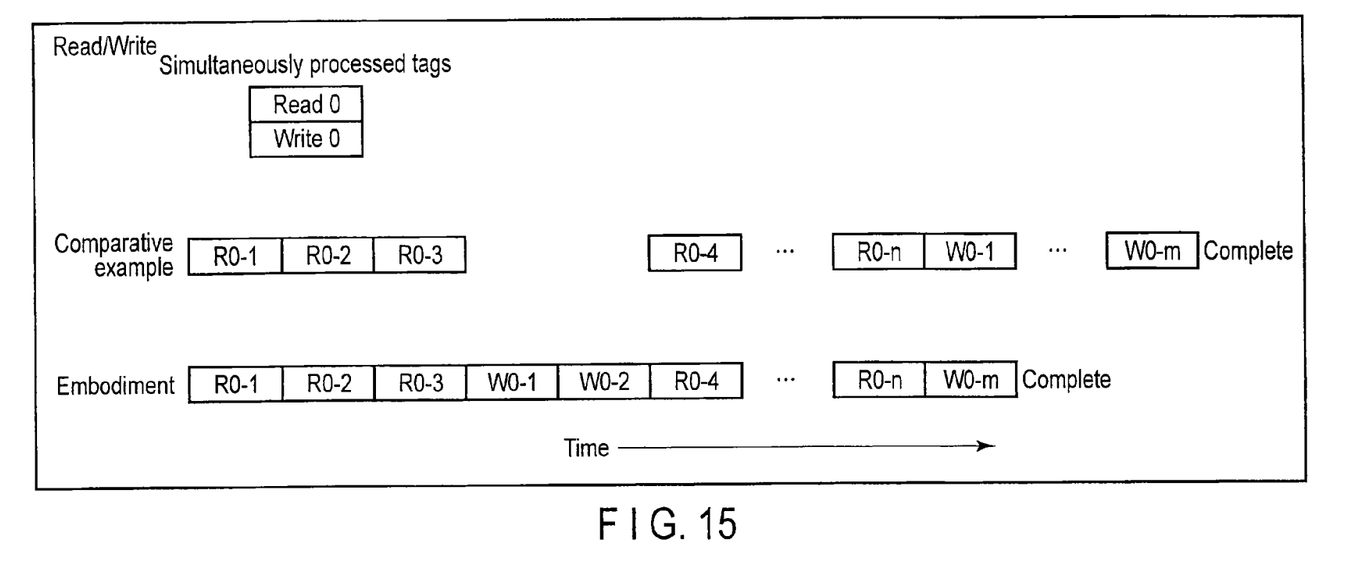
FIG. 15 shows parallel processing of a plurality of tags according to a third embodiment.
Figure 16:
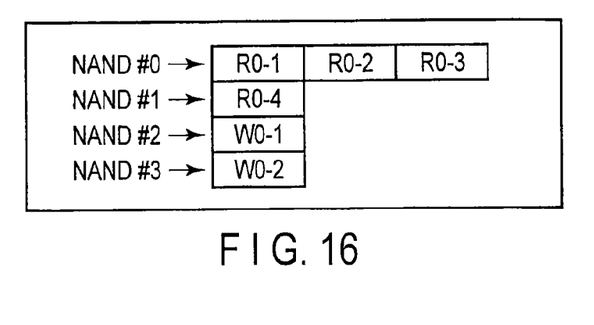
FIG. 16 shows examples of data distributed to channels.

FIGS. 15 and 16 show a read/write flow as the assumption of a third embodiment.

The third embodiment is characterized in that data writing associated with the second command is performed during data reading associated with the first command, thereby enabling parallel processing of the first and second queued commands to enhance the efficiency of command processing and/or data transfer.

In the third embodiment, the frontend part FE accepts data transfers (accept (R0)) in response to a data transfer request (transfer request (R0)) from the backend part BE#0 to the frontend part FE. The frontend part FE also accepts data transfers (accept (W0)) in response to a data transfer request (transfer request (W0)) from the backend part BE#1 to the frontend part FE.

At this time, however, DSFIS responsive to the data transfer requests is not transferred from the frontend part FE to the host.

Subsequently, data transfers (data readings) are performed from the backend part BE#0 to the host via the frontend part FE (data transfer (R0)). Further, data transfers (data writings) are performed from the host to the backend part BE#0 via the frontend part FE (data transfer (W0)).

R0-1, R0-2, R0-3, ..., R0-$n$ denote the data to be transferred from the backend part BE#0 to the host via the frontend part FE, and W0-1, ..., W0-$m$ denote the data transferred from the host to the backend part BE#1 via the frontend part FE. $n$ and $m$ are natural numbers.

The data transfers (W0-1, W0-2) from the frontend part FE to the backend part BE#1, for example, are performed within an empty band in which no data is transferred from the backend part BE#0 to the frontend part FE, i.e., within an unoccupied time period (available time period) between data transfers R0-3 and R0-4.

The empty band will occur within, for example, a period in which the channel used for data transfers from the backend part BE#0 to the frontend part FE is switched from a first channel (NAND #0) to a second channel (NAND #1).

At this time, data transfers (W0-1, W0-2) from the frontend part FE to the backend part BE#1 can be performed utilizing third and fourth channels (NAND #2, NAND #3).

After completing these data transfers, a transfer, to the host, of FIS indicating that the processing associated with the first and second execution commands has been completed, i.e., a D2H register FIS transfer, is performed (transfer complete (R0), transfer complete (W0)).

For instance, a DSFIS transfer associated with the first execution command and a D2H register FIS transfer indicating the completion of the processing associated with the first execution command are sequentially performed. Subsequently, a DSFIS transfer associated with the second execution command and a D2H register FIS transfer indicating the completion of the processing associated with the second execution command are sequentially performed.

(4) Fourth Embodiment

Figure 17:
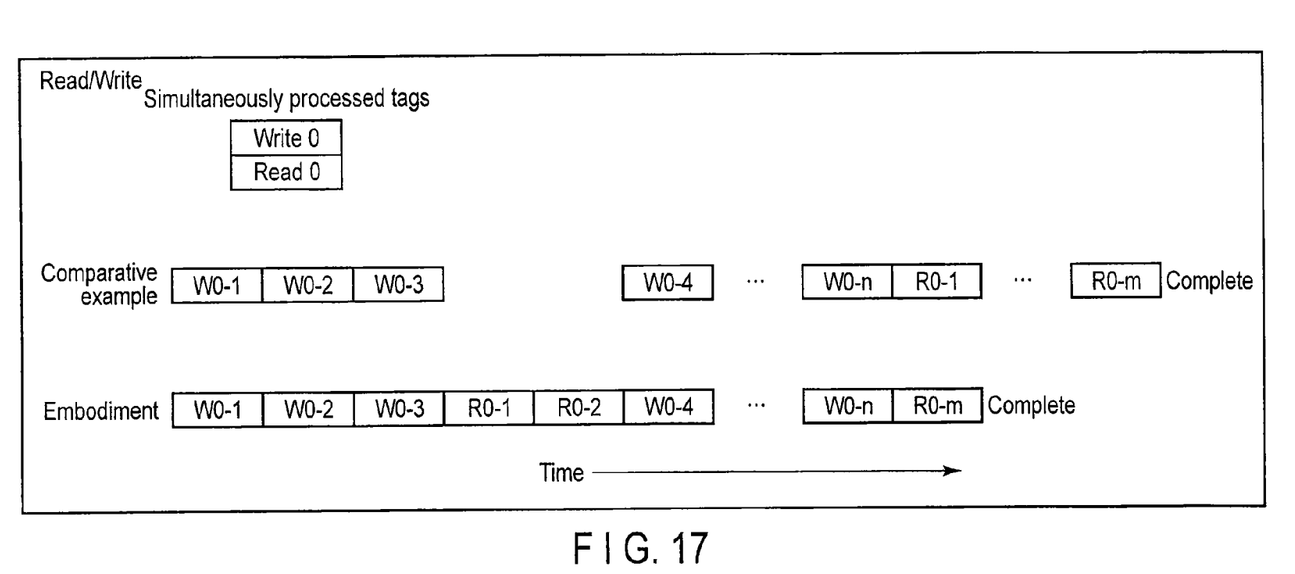
FIG. 17 shows parallel processing of a plurality of tags according to a fourth embodiment.
Figure 18:
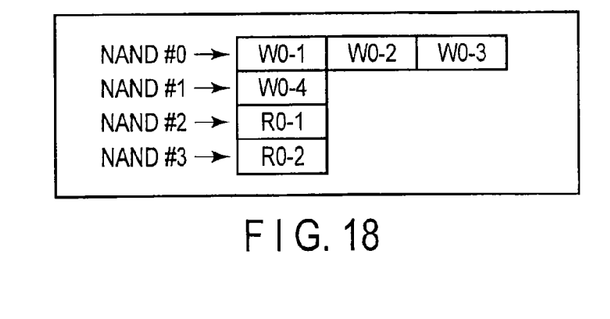
FIG. 18 shows examples of data distributed to channels.

FIGS. 17 and 18 show a read/write flow as the assumption of a fourth embodiment.

The fourth embodiment is characterized in that data reading associated with the second command is performed during data writing/reading associated with the first command, thereby enabling parallel processing of the first and second queued commands to enhance the efficiency of command processing and/or data transfer.

In the fourth embodiment, the frontend part FE accepts data transfers (accept (W0)) in response to a data transfer request (transfer request (W0)) from the backend part BE#1 to the frontend part FE. The frontend part FE also accepts data transfers (accept (R0)) in response to a data transfer request (transfer request (R0)) from the backend part BE#0 to the frontend part FE.

At this time, however, DSFIS corresponding to these transfer requests is not transferred from the frontend part FE to the host.

Subsequently, data transfers (data writings) are performed from the host to the backend part BE#0 via the frontend part FE (data transfer (W0)). Further, data transfers (data readings) are performed from the backend part BE#0 to the host via the frontend part FE (data transfer (R0)).

W0-1, W0-2, W0-3, . . . , W0-n denote the data to be transferred from the host to the backend part BE#1 via the frontend part FE, and R0-1, . . . , R0-m denote the data to be transferred from the backend part BE#0 to the host via the frontend part FE. n and m are natural numbers.

The data transfers (R0-1, R0-2) from the backend part BE#1 to the frontend part FE are performed within an empty band in which no data is transferred from the backend part BE#0 to the frontend part FE, i.e., within an unoccupied time period (available time period) between data transfers W0-3 and W0-4.

The empty band will occur within, for example, a period in which the channel used for data transfers from the frontend part FE to the backend part BE#0 is switched from a first channel (NAND #0) to a second channel (NAND #1).

At this time, data transfers (R0-1, R0-2) from the backend part BE#1 to the frontend part FE can be performed utilizing third and fourth channels (NAND #2, NAND #3).

After completing these data transfers, a transfer, to the host, of FIS indicating that the processing associated with the first and second execution commands has been completed, i.e., a D2H register FIS transfer, is performed (transfer complete (W0), transfer complete (R0)).

For instance, a DSFIS transfer associated with the first execution command and a D2H register FIS transfer indicating the completion of the processing associated with the first execution command are sequentially performed. Subsequently, a DSFIS transfer associated with the second execution command and a D2H register FIS transfer indicating the completion of the processing associated with the second execution command are sequentially performed.

Applied Example

The above-described embodiments match, for example, a transfer protocol between a host and an HBA, which complies with the AHCI standard. Further, each embodiment can be effectively applied to a product (e.g., a storage device, such as an SSD or a memory card) with an HBA (or controller) and a SATA device (or memory device) provided as one package.

Figure 19:
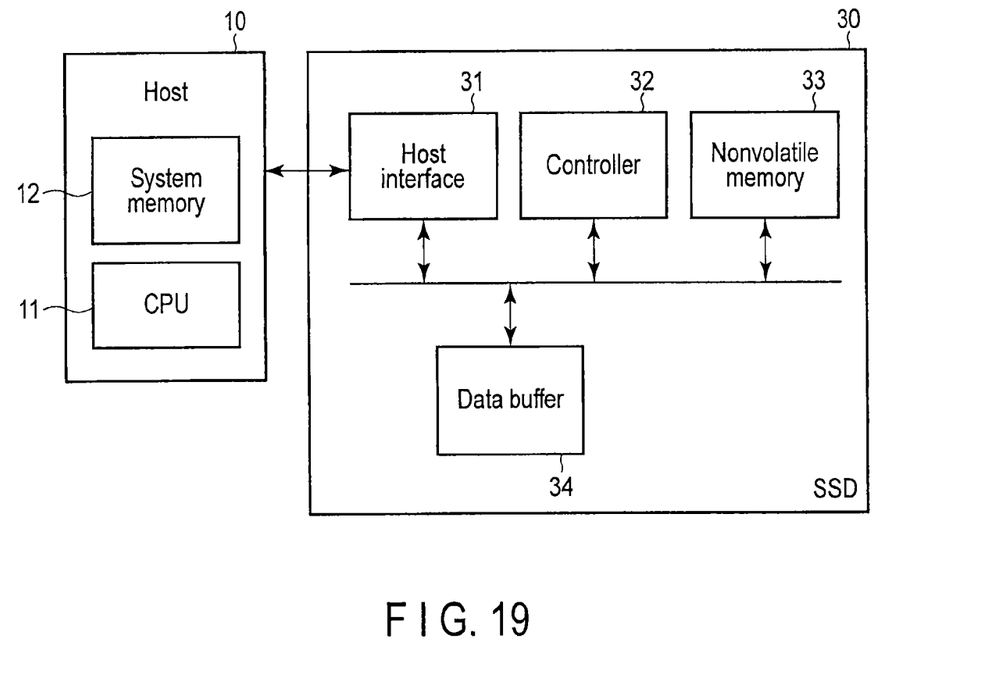
FIG. 19 is a block diagram showing an SSD as an applied example.

FIG. 19 shows an SSD as an applied example.

As shown, an SSD 30 comprises a host interface 31, a controller 32, a nonvolatile memory 33 and a data buffer 34. The host interface 31 functions as an interface between a host 10 and the SSD 30. The host 10 comprises a CPU 11 and a system memory 12.

The nonvolatile memory 33 is, for example, a flash memory. The data buffer 34 is, for example, a DRAM or an MRAM (magnetic random access memory). Namely, it is sufficient if the data buffer 34 may be a random access memory faster in operation than the nonvolatile memory 33 as a storage memory.

The controller 32 controls data reading, writing and erasing on the nonvolatile memory 33. For instance, if the nonvolatile memory 33 is a NAND flash memory, the size of the data exchanged between the host 10 and the host interface 31 differs from the size of the data that is read, written or erased in the NAND flash memory.

To overcome disadvantages (such as reduction of read/write speed and occurrence of a bad block) resulting from the above difference, the controller 32 controls data reading, writing and erasing on the nonvolatile memory 33.

CONCLUSION

In the above-described embodiments, efficiency of command processing and/or data transfer can be enhanced by processing a plurality of queued commands in parallel.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system connectable to a host comprising:
a first nonvolatile memory;
a second nonvolatile memory; and
a memory controller comprising a frontend part configured to communicate with the host, a first backend part configured to control the first nonvolatile memory, and a second backend part configured to control the second nonvolatile memory, wherein the frontend part is configured to:
transmit a first data transfer request for transferring data in which the first backend part read from the first nonvolatile memory in accordance with a first command from the first backend part to the frontend part, when receiving the first and second commands from the host, the first command which indicates reading data from the first nonvolatile memory, the second command which indicates reading data from the second nonvolatile memory;
transmit a second data transfer request for transferring data in which the second backend part read from the second nonvolatile memory in accordance with the second command from the second backend part to the frontend part;
accept the first and second data transfer requests when the frontend part sequentially receives the first and second data transfer requests;
transmit first data items to the host when receiving the first data items from the first backend part, the first data items being data read from the first nonvolatile memory in accordance with the first data transfer request;
transmit second data items to the host when receiving the second data items from the second backend part, the second data items being data read from the second nonvolatile memory in accordance with the second data transfer request;
transmit a part of the second data items to the host, when receiving the part of the second data items from the second backend part, within a time period in which none of the first data items is received from the first backend part;
transmit a first execution result corresponding to the first command received from the host, when receiving a third data item from the first backend part, the third data item indicating that transfers of the first data items have been completed; and
transmit a second execution result corresponding to the second command received from the host, when receiving a fourth data item from the second backend part, the fourth data item indicating that transfers of the second data items have been completed.

2. The memory system of claim 1, wherein
the frontend part does not transmit a first response to the host after accepting the first data transfer request, the first response corresponding to the first data transfer request, and
the frontend part does not transmit a second response to the host after accepting the second data transfer request, the second response corresponding to the second data transfer request.

3. The memory system of claim 2, wherein
the first backend part transmits the first data items to the frontend part in accordance with an acceptance of the first data transfer request, and
the second backend part transmits the second data items to the frontend part in accordance with an acceptance of the second data transfer request.

4. The memory system of claim 3, wherein the frontend part communicates to the host based on an advanced host controller interface (AHCI) standard.

5. The memory system of claim 4, wherein
the first backend part comprises a first data buffer and transmits data to the frontend part through the first data buffer,
the second backend part comprises a second data buffer and transmits data to the frontend part through the second data buffer, and the frontend part comprises a first controller controlling an access to the first data buffer and a second controller controlling an access to the second data buffer.

6. The memory system of claim 5, wherein the frontend part comprises an arbiter which determines whether to select the first controller or the second controller.

7. The memory system of claim 1, wherein each of the first and second nonvolatile memory is a NAND flash memory.

8. The memory system of claim 1, wherein
the frontend part is configured to:
accept a request of an execution of third and fourth commands from the backend part, the third command which indicates writing data to the first nonvolatile memory, the fourth command which indicates writing data to the second nonvolatile memory, and
the backend part is configured to:
queue commands including the third and fourth commands, and
execute a data communication according to the third command with respect to an attachment device and a data communication according to the fourth command with respect to the attachment device in parallel.

9. The memory system of claim 8, wherein the data communications according to the third and fourth commands with respect to the attachment device are data writes to the attachment device respectively.

10. The memory system of claim 9, wherein
the backend part comprises channels, and
the data writes to the attachment device are executed independent of each of the channels.

11. The memory system of claim 10, wherein the backend part executes the data write according to the fourth command in an empty band of the data write according to the third command.

12. The memory system of claim 11, wherein the empty band generates in a term in which the data write according to the third command is changed from a first channel to a second channel among the channels.

13. The memory system of claim 12, wherein the frontend part is configured to execute a data communication with respect to the host based on a predetermined communication protocol.

14. The memory system of claim 1, wherein
the frontend part is configured to:
accept a request of an execution of third and fourth commands from the backend part, the third command which indicates reading data from the first nonvolatile memory, the fourth command which indicates writing data to the second nonvolatile memory, and
the backend part is configured to:
queue commands including the third and fourth commands, and
execute a data communication according to the third command with respect to an attachment device and a data communication according to the fourth command with respect to the attachment device in parallel.

15. The memory system of claim 14, wherein
the data communications according to the third command with respect to the attachment device is a data write to the attachment device, and
the data communications according to the fourth command with respect to the attachment device is a data read from the attachment device.

16. The memory system of claim 15, wherein
the backend part comprises channels, and
the data reads from the attachment device are executed independent of each of the channels.

17. The memory system of claim 16, wherein the backend part executes the data write according to the fourth command in an empty band of the data read according to the third command.

18. The memory system of claim 17, wherein the empty band generates in a term in which the data read according to the third command is changed from a first channel to a second channel among the channels.

19. The memory system of claim 18, wherein
the backend part comprises channels, and
the data writes to the attachment device are executed independent of each of the channels.

20. The memory system of claim 19, wherein the frontend part is configured to execute a data communication with respect to the host based on a predetermined communication protocol.

* * * * *